United States Patent
Byrne et al.

(10) Patent No.: US 10,318,909 B2
(45) Date of Patent: *Jun. 11, 2019

(54) SPATIO-TEMPORAL KEY PERFORMANCE INDICATORS

(71) Applicant: International Business Machines Corporation, Armonk, NY (US)

(72) Inventors: Brian P. Byrne, Austin, TX (US); Adam R. Holley, Austin, TX (US); Brian T. Lillie, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 674 days.

This patent is subject to a terminal disclaimer.

(21) Appl. No.: 14/265,045

(22) Filed: Apr. 29, 2014

(65) Prior Publication Data

US 2015/0310371 A1 Oct. 29, 2015

(51) Int. Cl.
*G06Q 10/06* (2012.01)
*G01C 21/36* (2006.01)
*G06N 5/04* (2006.01)

(52) U.S. Cl.
CPC ... *G06Q 10/06393* (2013.01); *G01C 21/3691* (2013.01); *G06N 5/04* (2013.01); *G06Q 10/06375* (2013.01); *G06Q 10/063* (2013.01)

(58) Field of Classification Search
CPC .... G01C 21/3691; G06N 5/04; G06Q 10/063; G06Q 10/06393; G06Q 10/06375
USPC ....................................................... 705/7.39
See application file for complete search history.

(56) References Cited

U.S. PATENT DOCUMENTS

| | | | | |
|---|---|---|---|---|
| 8,209,218 B1 * | 6/2012 | Basu | ................ | G06Q 10/0637 705/7.39 |
| 2002/0167408 A1 | 11/2002 | Trajkovic et al. | | |
| 2007/0226314 A1 * | 9/2007 | Eick | ................ | G06F 17/30896 709/217 |
| 2007/0294705 A1 * | 12/2007 | Gopalakrishnan | ..... | G06Q 10/00 719/315 |
| 2008/0071465 A1 * | 3/2008 | Chapman | ........... | G01C 21/3691 701/117 |
| 2009/0134968 A1 * | 5/2009 | Girgensohn | ....... | G06K 9/00771 340/3.1 |
| 2010/0299116 A1 * | 11/2010 | Tomastik | ........... | G06K 9/00771 703/2 |

(Continued)

FOREIGN PATENT DOCUMENTS

WO 2013062926 5/2013

OTHER PUBLICATIONS

Beibei Zahn et al. Crowd analysis: a survey. Machine Vision and Applications (2008). 19:345-357.*

(Continued)

*Primary Examiner* — Timothy Padot
(74) *Attorney, Agent, or Firm* — VanLeeuwen & VanLeeuwen; David B. Woycechowsky

(57) ABSTRACT

An approach is provided for providing spatio-temporal key performance indicators (ST-KPIs). The approach tracks metrics, such as crowd density, pertaining to a number of locations. The tracking is performed over time to develop a history of past values that correspond to the metrics. The history is used to predict a trend of future metrics at the locations with the trend resulting in predicted future values that correspond to the metrics at the locations. In this manner, the ST-KPIs reflect the predicted future values at the various locations that are being monitored. A city view is displayed to a user showing the current and predicted values at defined ST-KPI locations throughout the city.

4 Claims, 10 Drawing Sheets

(56) References Cited

U.S. PATENT DOCUMENTS

| | | | |
|---|---|---|---|
| 2011/0080303 A1* | 4/2011 | Goldberg | G08G 1/07 340/909 |
| 2012/0324017 A1 | 12/2012 | Bellomo | |
| 2013/0132045 A1 | 5/2013 | Mello et al. | |
| 2013/0268196 A1* | 10/2013 | Dam | G01W 1/00 702/3 |
| 2014/0172489 A1* | 6/2014 | Goulart | G06Q 10/06312 705/7.22 |
| 2014/0278688 A1 | 9/2014 | Sullivan et al. | |

OTHER PUBLICATIONS

Real-time crowd density mapping using a novel sensory fusion model of infrared and visual systems. Yaseen, S; Al-Habaibeh, A; Su, D.; Otham, F. Safety Science 57: 313-325. Elsevier Ltd. (2013).*

Estimating Crowd Density in an RF-Based Dynamic Environment Yuan, Yaoxuan; Zhao, Jizhong; Qiu, Chen; Xi, Wei. IEEE Sensors Journal 13.10: 3837-3845. IEEE-INST Electrical Electronics Engineers Inc. (Oct. 2013).*

Byrne et al., "Spatio-Temporal Key Performance Indicators," U.S. Appl. No. 14/843,360, filed Sep. 2, 2015, 43 pages.

"List of IBM Patents or Patent Applications Treated as Related," Letter from Leslie A. Van Leeuwen, Sep. 2, 2015, 1 page.

Anonymous, "System and Method to Crowd Source Service Designs," ip.com, IPCOM000225159D, Jan. 28, 2013, 5 pages.

Ghose et al., "The Role of Multi-scalar GIS-based Indicators Studies in Formulating Neighborhood Planning Policy," URISA Journal, vol. 14, No. 2, 2002, pp. 5-17.

Community Health Status Indicators Report, U.S. Centers for Disease Control and Prevention, 2009, 6 pages.

* cited by examiner

SPATIO-TEMPORAL KEY PERFORMANCE INDICATORS

BACKGROUND OF THE INVENTION

Traditional Key Performance Indicators (KPIs) are widespread in their use, but also have limitations. For example, in a "Smarter Cities" usage, it is frequently insufficient to track the performance of indicators at an aggregated level, irrespective of space and time. Technologies endeavor to create smarter cities of the future that will drive sustainable economic growth. Leaders of smarter cities will have the tools to analyze data for better decisions, anticipate problems to resolve them proactively and coordinate resources to operate effectively. As demands grow and budgets tighten, solutions also have to be smarter, and address the city as a whole. By collecting and analyzing the extensive data generated every second of every day, technology will be used to coordinate and share data in a single view creating the big picture for the decision makers and responders who support the smarter city.

By definition, Smarter City-based use cases are concerned with geospatial and temporal distribution of data sets, and by consequence, the tracking of these data sets as KPIs frequently requires the consideration of space and time. For example, the tracking of crowd density at key points across a city can be used for various reasons, perhaps for crowd control for a concert or public event. Simply tracking numbers of citizens, or crowd density is insufficient. Typically the operator wishes to see visually, over multiple locations the current indicators. However, traditional KPIs are insufficient with regards to visually depicting future values of indicators at various locations and times.

SUMMARY

An approach is provided for providing spatio-temporal key performance indicators (ST-KPIs). The approach tracks metrics, such as crowd density, pertaining to a number of locations. The tracking is performed over time to develop a history of past values that correspond to the metrics. The history is used to predict a trend of future metrics at the locations with the trend resulting in predicted future values that correspond to the metrics at the locations. In this manner, the ST-KPIs reflect the predicted future values at the various locations that are being monitored. A city view is displayed to a user showing the current and predicted values at defined ST-KPI locations throughout the city.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
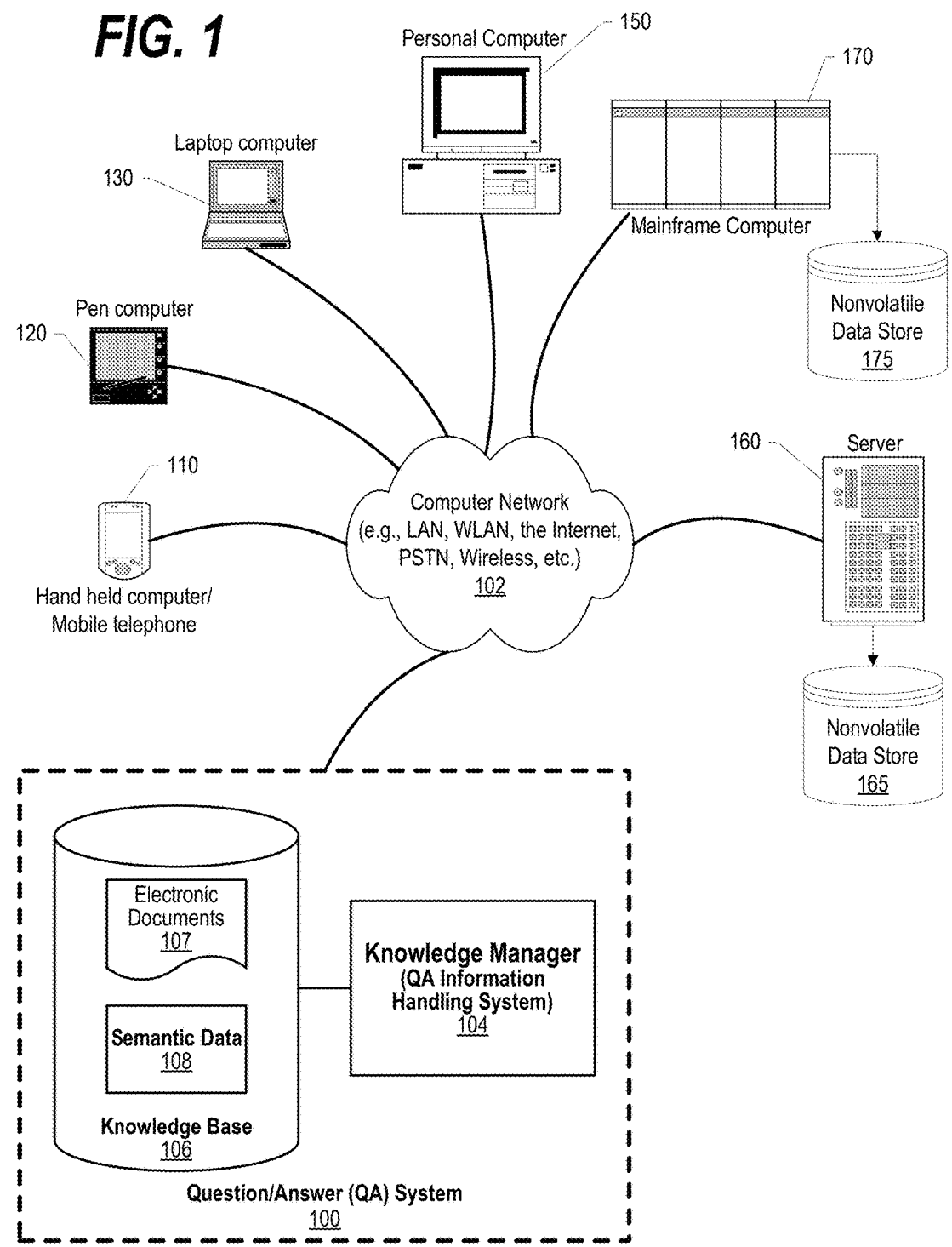
FIG. 1 depicts a network environment that includes a Question/Answer (QA) system that utilizes a knowledge base.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 depicts a schematic diagram of one illustrative embodiment of a question/answer creation (QA) system 100 in a computer network 102. Knowledge manager 100 may include a computing device 104 (comprising one or more processors and one or more memories, and potentially any other computing device elements generally known in the art including buses, storage devices, communication interfaces, and the like) connected to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. Knowledge manager 100 and network 102 may enable question/answer (QA) generation functionality for one or more content users. Other embodiments of knowledge manager 100 may be used with components, systems, sub-systems, and/or devices other than those that are depicted herein.

Knowledge manager 100 may be configured to receive inputs from various sources. For example, knowledge manager 100 may receive input from the network 102, a corpus of electronic documents 106 or other data, a content creator 108, content users, and other possible sources of input. In one embodiment, some or all of the inputs to knowledge manager 100 may be routed through the network 102. The various computing devices 104 on the network 102 may include access points for content creators and content users. Some of the computing devices 104 may include devices for a database storing the corpus of data. The network 102 may include local network connections and remote connections in various embodiments, such that knowledge manager 100 may operate in environments of any size, including local and global, e.g., the Internet. Additionally, knowledge manager 100 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, the content creator creates content in a document 106 for use as part of a corpus of data with knowledge manager 100. The document 106 may include any file, text, article, or source of data for use in knowledge manager 100. Content users may access knowledge manager 100 via a network connection or an Internet connection to the network 102, and may input questions to knowledge manager 100 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, phrases, signs, and symbols, and what they stand for, their denotation, or connotation. In other words, semantic content is content that interprets an expression, such as by using Natural Language (NL) Processing. In one embodiment, the process sends well-formed questions (e.g., natural language questions, etc.) to the knowledge manager. Knowledge manager 100 may interpret the question and provide a response to the content user containing one or more answers to the question. In some embodiments, knowledge manager 100 may provide a response to users in a ranked list of answers.

In some illustrative embodiments, knowledge manager 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information handling systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 100. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
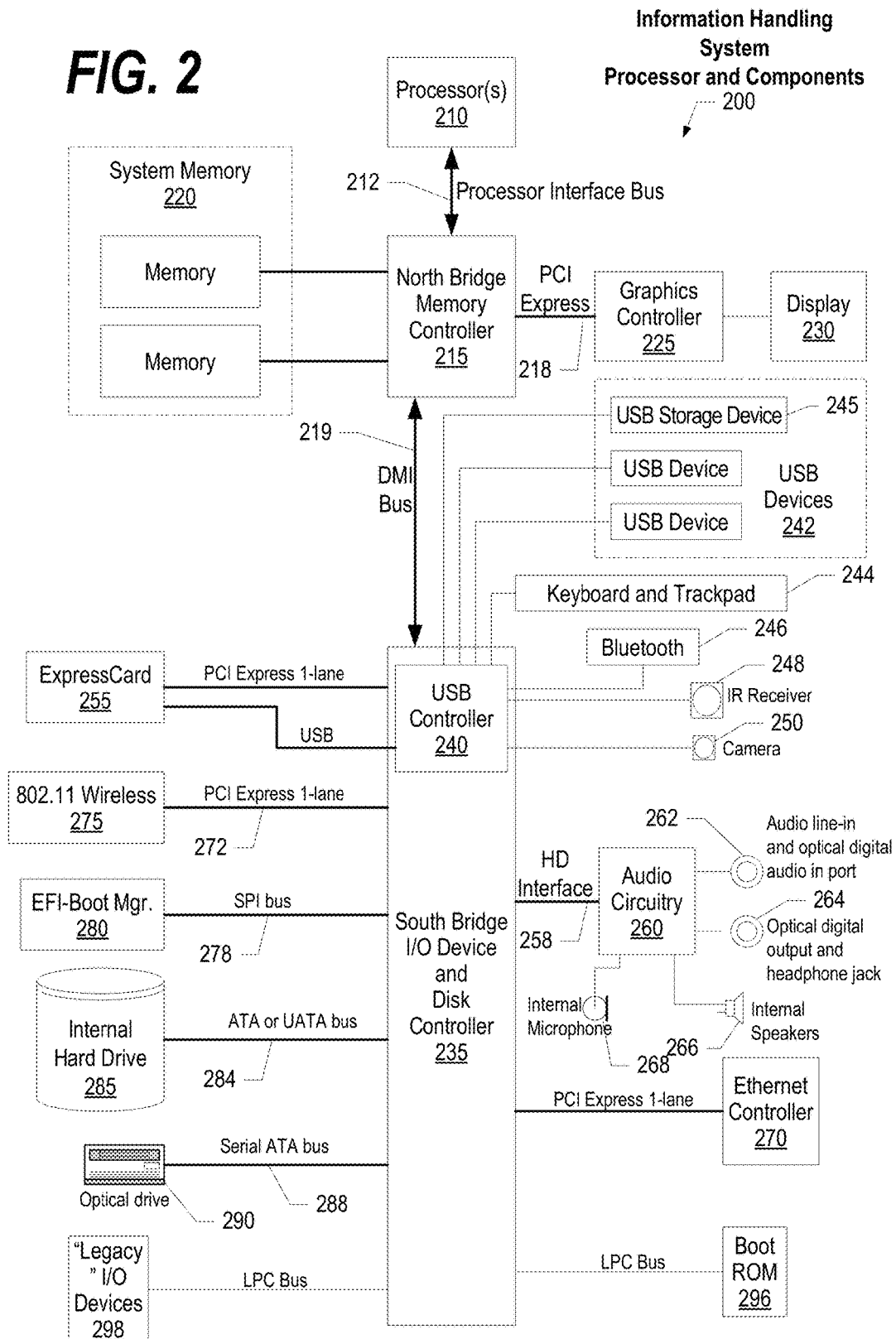
FIG. 2 is a block diagram of a processor and components of an information handling system such as those shown in FIG. 1.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE 802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

FIGS. 3-10 depict an approach that can be executed on an information handling system, to provide spatio-temporal key performance indicators (ST-KPIs). A performance indicator or key performance indicator (KPI) is a traditional type of performance measurement. An organization may use KPIs to evaluate its success, or to evaluate the success of a particular activity in which it is engaged. Spatio-temporal KPIs (or "ST-KPIs") provide space and time attributes to traditional KPIs providing a user with useful visual indicators to assist in managing complex systems. ST-KPIs include a number of elements including an aggregated KPI value, Spatial Indicators, and a Value Scale. As with traditional KPIs, the user may track an overall aggregated KPI value representing the aggregation of all tracked locations, at the current time. The aggregation function in use may be variable—in most cases "sum" but average, median, and other functions are also available as needs dictate. In one embodiment, the Aggregated KPI value is provided via a graphical user interface (GUI) control and may further operate as a GUI button to toggle the visibility of any ST-KPI layer.

Spatial Indicators provide the user with a rapidly interpretable visual cue as to the status of the KPI. In the case of the ST-KPI, these are visual indicators on the display depicting locations, such as on a map. The visual indicators might be configured as colored or highlighted squares that appear on the display. The location of these indicators is selected as part of the specification of the ST-KPI and the highlighting of these indicators is in accordance with the value of the KPI with respect to a defined value scale. Each ST-KPI references 1 . . . N spatial locations at which the KPI values are computed as a set and displayed to the user.

ST-KPIs are computed and visually represented against a value scale which is specified for the KPI. A value scale has 2 . . . N value ranges, with each including a set of limits and a visual highlight (e.g., color, etc.) coding. For example, in the case of a crowd control ST-KPI, the system might be configured to have three ranges; High (red) being >=500 people per square block, Medium (yellow) being >200 and <499 people per square block, and Low (green) being <=199 people per square block. At any given moment, the ST-KPI value is compared against this value scale to determine how to represent the value to the user, for example through a color gradient.

The user, wishing to investigate an ST-KPI in more detail may select that ST-KPI (for example on a map). In this case, the user is presented with ST-KPI details (for example as illustrated as a pop-up). ST-KPIs represent multiple aspects of the KPI at once in their visual representation. First, the current ST-KPI value is represented in relation to the defined value scale. Second, the temporal changes in the ST-KPI are represented, both past values and, as need dictates, projected values. Third, a threshold can be displayed for the ST-KPI, such as upper and/or lower limits on the allowed or expected KPI values. Knowing these limits as well as projected values for the KPI also allows the overlay of a projected time at which the threshold will be breached for this KPI.

ST-KPI details may, where appropriate be projected based on past values through mathematical functions. For example, in the case of a crowd control ST-KPI, a linear or geometric extrapolation can be applied to project the future values of the ST-KPI at a specific location over time. Taking a linear example, if the hourly values of the ST-KPI at a given location were 1 pm: 200, 2 pm: 249, 3 pm 301 . . . then the projected values would be 4 pm: 350, 5 pm: 400 and so on. When specifying the ST-KPI the projection function could be selected by the user, or a projection function could be automatically selected by analysis of the trending of the data values through curve-fitting techniques.

In one embodiment, the temporal aspects of an ST-KPI are presented through a timeline view. This allows the individual defined locations for an ST-KPI to be monitored in relation to each other over time, as well as allowing the distinct location bars to be collapsed into a single aggregated ST-KPI value over time for all locations. In one embodiment, the changes in value of the ST-KPI are represented through a gradient in accordance with the Value Scale for the ST-KPI. Note also that the timeline view also includes an indicator for the current time and corresponding ST-KPI values, as well as projected values and the estimated time of breach of any defined thresholds.

ST-KPIs may be related to actions that may be taken either manually by the user, or automatically on reaching a defined ST-KPI limit or limits. One or more actions may be related to an ST-KPI when specifying an ST-KPI, and made available to the user through the ST-KPI details. A specific action may also be configured and related to the limits defined for an ST-KPI if automatic actions are required. If the ST-KPI falls back below the threshold, it is a matter of configuration whether the original action is cancelled, a new action is initiated, or no action is performed.

The ST-KPI thresholds described here are relative simple. However, thresholds may be more complex than a simple limit and may be derived dynamically based on external criteria. For example, using the crowd control example, 500 people in a square block radius may not be at all unusual during peak times in a busy tourist district. However, this volume of people in the same area at 4 am might be highly unusual. The approach described herein allows for complex functions for ST-KPI thresholds, not simply actions based on a predefined limit.

In specifying an ST-KPI, various details are provided to the system by the user. These details can include (1) the name and description of the ST-KPI, such as a street-named intersection, (2) data sources and values from which the ST-KPI is computed, such as a crowd density metric that is collected in real time and stored in a particular data store, (3) spatial locations at which to compute the ST-KPI, such as cameras or other sensors near the street-named intersection (4) a spatial range over which values are aggregated for the ST-KPI at each defined location, such as a range that is expressed as a radius, block count or other measure, (5) an aggregation function for the ST-KPI, such as an average crowd density (6) a value scale for the ST-KPI, such as a shaded scale with light shading for a low crowd density (e.g., less than 100 people, etc.) to a very dark shading for a high crowd density (e.g., more than 500 people, etc.), (7) threshold values and optionally actions to be performed when thresholds are breached, such as an action to notify law enforcement when crowd density is greater than a threshold value of 400, and (8) a projection function (e.g., linear, differential, etc.) for projecting future ST-KPI values. As described herein, a user can dynamically define new ST-KPIs that draws upon measurements obtained at a monitored system. A monitored system may be a Smart City with sensors, such as cameras, that detect and monitor crowd-based data, such as crowd density. In this manner, a user can dynamically define an area, such as a street intersection and include various details outlined above such as name, data sources, spatial locations, spatial range, aggregation functions, value scales, threshold values, actions to take when thresholds are breached, and projection functions. Another type of monitored system could be a computer network with monitors at various nodes of the network that report various network metrics (e.g., packets received, throughput, etc.). In a computer network embodiment, an administrator could see a layout of a network with monitored current values pertaining to different parts of the network appearing on the screen. The ST-KPI display would show the various defined network locations, the current values (e.g., packets, etc.) at the locations, the predicted future values based on the projection functions, and thresholds/actions used to define and address network bottlenecks, etc. In addition, the user can periodically refine defined ST-KPIs by adjusting the various attributes of the ST-KPI (e.g., changing the threshold values, changing or adding actions, expanding or narrowing the spatial range, etc.).

One usage of ST-KPIs pertains to its usage in crowds. Various types of crowd based metrics are available to ST-KPIs for measuring different aspects of crowds. One such measurement is crowd density which is the number of people present in a set amount of space, such as a block or a number of square meters, etc. Another such crowd measurement is crowd collectiveness that indicates the degree of individuals acting as a collective body with a similar purpose, or collectiveness. Another crowd measurement is crowd noise measurements, with louder crowd noise per individual crowd member perhaps indicating increased excitement or anger of the crowd. Crowd throughput measurement may pertain to pedestrian traffic or vehicle traffic passing through a particular space, such as an intersection. High throughput indicates faster moving traffic, while low throughput indicates slow, or stalled, traffic, such as might be present at an event or protest. In a city view implementation, various city representations are depicted on a screen displayed to a user. The user can define different ST-KPIs based on the needs of the user or organization. The city view can be an actual to scale city map, a stylized representation of the city such as a subway map drawn so that the nodes are easier to see, but not necessarily to scale. In addition, different overlays for different services, power, cable, transportation, fire, police, etc. can be provided, each with its own ST-KPIs. In this manner, a city view depicting crowds can be provided using sensors, such as cameras, that monitor crowds and the like using a crowd overlay to provide ST-KPI data to a police department. In another embodiment, a power-grid overlay can be used showing substations and other monitored installations of an electric utility with the monitors providing power consumption data and the ST-KPI showing current power consumption values as well as predicting future power usage throughout the city so that the electric utility can plan for potential problems in the city's electric grid.

In a Smart City setting, for example, a city may be having an annual street festival on Pecan Street where crowd control might be important. The user can establish a new ST-KPI to monitor crowds at this event. Sensors at the intersections of Pecan Street (e.g., where 4th, 5th and 6th Streets intersect Pecan Street, etc.) bound the area where the festival takes place. While some of the sensors are useful for crowd measurement, e.g., cameras, motion sensing, etc., other sensors might not useful. Therefore, the user can select the particular sensors to use for the newly defined ST-KPI. In addition, there might be some sensors in the festival area itself, such as temporary sensors installed by the police department to better monitor festival activities. In this example, the user defines a new ST-KPI (Pecan Street Festival), specifically selecting which sensors, prediction function, threshold values, and actions to use for the new ST-KPI. Being an annual festival, the user can delete or disable the defined ST-KPI when the festival is over and then re-enable the ST-KPI the next year when the festival is again scheduled to take place.

Figure 3:
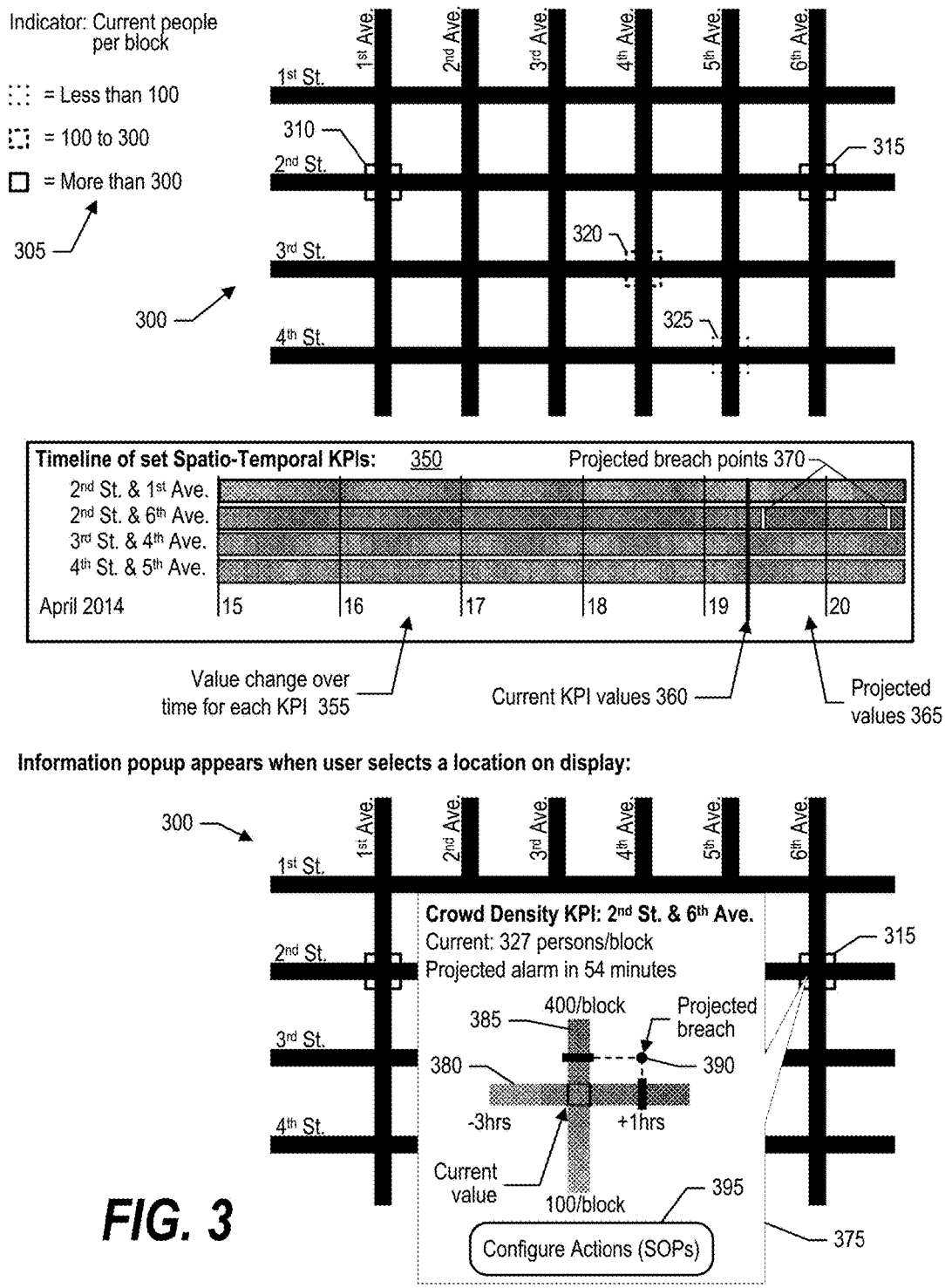
FIG. 3 is a diagram depicting usage of spatio-temporal key performance indicators (ST-KPIs) in a smart city example.

FIG. 3 is a diagram depicting usage of spatio-temporal key performance indicators (ST-KPIs) in a smart city example. Display 300 is a display of map depicting a city grid of streets and avenues. Various locations have been selected for ST-KPI analysis. In the example, the selected locations are various intersections of streets and avenues. Legend 305 shows the visual indicators used to depict current values for the various intersections that have been selected. A square formed by dotted lines appears at intersections that currently have less than 100 people per block, a square formed by dashed lines appears at intersections that currently have between 100 and 300 people per block, and a square formed by solid lines appears at intersections that currently have less more than 300 people per block. In one embodiment, the visual indicator can be further highlighted (e.g., blinking, etc.) at locations where a threshold breach is predicted. The locations that have been selected include locations 310, 315, 320, and 325. Based on the displayed visual indicators, two of these locations, 310 and 315, are currently in the high category, while location 320 is currently in the medium category and location 325 is currently in the low category. As depicted in timeline 350, location 315 has a threshold that is expected to be breached soon. If a breach indication highlight is being used, the square at location 315 would be further highlighted (e.g., blinking the square, etc.).

Timeline 350 depicts the set of ST-KPIs over time. A history of past values that correspond to the metrics (e.g., crowd density, etc.) at each location is maintained and shown in left portion 355 of the depicted visual density bars. The current values that correspond to the metrics at each location is shown at the bar position shown by vertical line 360. Finally, predicted future values that correspond to the metrics are predicted based on the history of the past values based on a trend of the future values at the various locations. The predicted future values are shown in right portion 365 of the displayed visual density bars. A breach of a threshold is predicted for one of the locations with a narrow vertical rectangle appearing at each time when the breach is predicted. In the example shown, a breach is predicted for a time in the near future as well as a breach that is predicted to occur on the next day.

Popup 375 appears when the user selects one of the locations. In the example shown, the user has selected location 315. The popup displays detailed information regarding the selected location. This detailed information includes the current value which informs the user that there are currently 327 people per block at this location. In addition, the popup informs the user that a breach of a threshold is predicted in 54 minutes. A graph of the location is also shown in popup 375. Horizontal bar 380 shows the visual density bar for the location with the portion of the bar to the left of the square showing the past values at the location for the past three hours, the square indicating the current value, and the portion of the bar to the right of the square showing the predicted future values of the metric, in this case crowd density. Vertical bar 385 shows the value scale that has been configured showing the visual depiction from between 100 people per block to 400 people per block. The solid black bar shown on vertical bar 385 shows the configured threshold, while the solid black bar shown on horizontal bar 380 shows the point at which the threshold is anticipated to be breached. Actions can be configured by selecting command button 395. These actions, performed when a threshold is breached or expected to be breached, might include triggering an alarm, notifying an administrator such as the police or fire department, or deploying resources to the location such as dispatching police or other crowd-control personnel.

Figure 4:
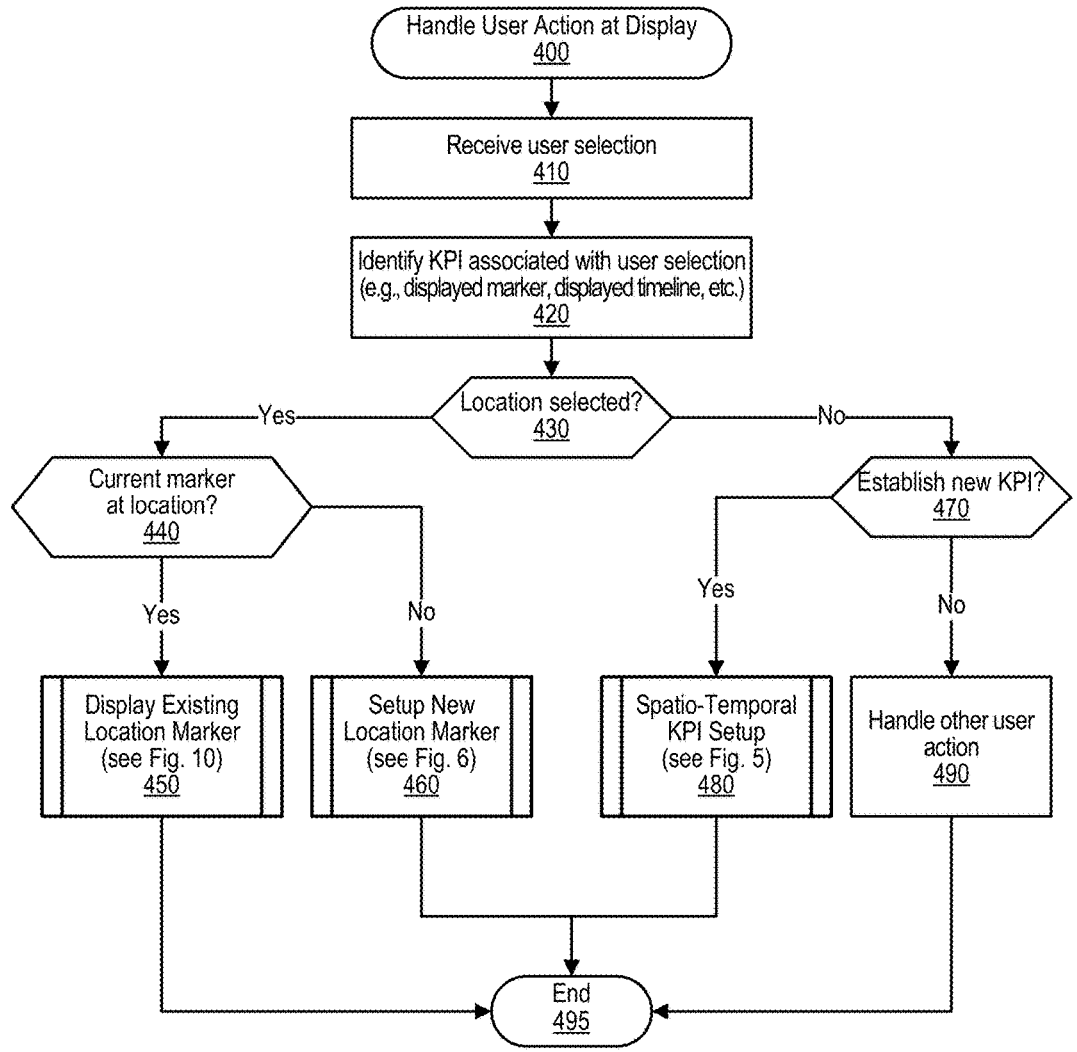
FIG. 4 is a depiction of a flowchart showing the logic used in the system to handle user actions regarding ST-KPIs at a display interface.

FIG. 4 is a depiction of a flowchart showing the logic used in the system to handle user actions regarding spatio-temporal key performance indicators (ST-KPIs) at a display interface. Processing commences at 400 whereupon, at step 410, the process receives a user action, such as an action received at a display via a graphical user interface (GUI). At step 420, the process identifies any ST-KPI that is associated with the received user selection. For example, the user might have clicked on a displayed location marker (e.g., location markers 310, 315, 320, and 325 shown in FIG. 3) or might have clicked on a location marker associated with a bar shown in a displayed timeline (e.g., timeline 350 shown in FIG. 3).

A determination is made as to whether the user has selected a ST-KPI location (decision 430). If the user selected a ST-KPI location, then decision 430 branches to the "yes" branch to process the selection. A determination (decision 440) is made as to whether the user has selected a previously established location marker (e.g., location markers 310, 315, 320, and 325 shown in FIG. 3). If the user has selected a previously established location marker, then decision 440 branches to the "yes" branch whereupon, at predefined process 450, the process displays detailed information regarding the location in a popup window (see FIG. 10 and corresponding text for further processing details). For an example of a popup window displaying detailed ST-KPI location information, see popup 375 in FIG. 3. On the other hand, if a location has been selected but the location has not yet been set as a marker (e.g., intersections other than intersections 310, 315, 320, and 325 shown in FIG. 3), then decision 440 branches to the "no" branch whereupon, at predefined process 460, the process sets up a new location marker at the location specified by the user (see FIG. 6 and corresponding text for further processing details).

Returning to decision 430, if a location was not selected, decision 430 branches to the "no" branch whereupon a determination is made as to whether the user wishes to establish a new key performance indicator (decision 470). Multiple key performance indicators can be established. For example, in a smart city usage, the user could establish a crowd density ST-KPI as well as a traffic flow, or throughput, ST-KPI. If the user is establishing a new ST-KPI, then decision 470 branches to the "yes" branch whereupon, at predefined process 480, a new ST-KPI is established (see FIG. 5 and corresponding text for further processing details). On the other hand, if the user is not establishing a new ST-KPI, then decision 470 branches to the "no" branch whereupon, at step 490, the process handles other user-initiated actions. The process thereafter ends at 495.

Figure 5:
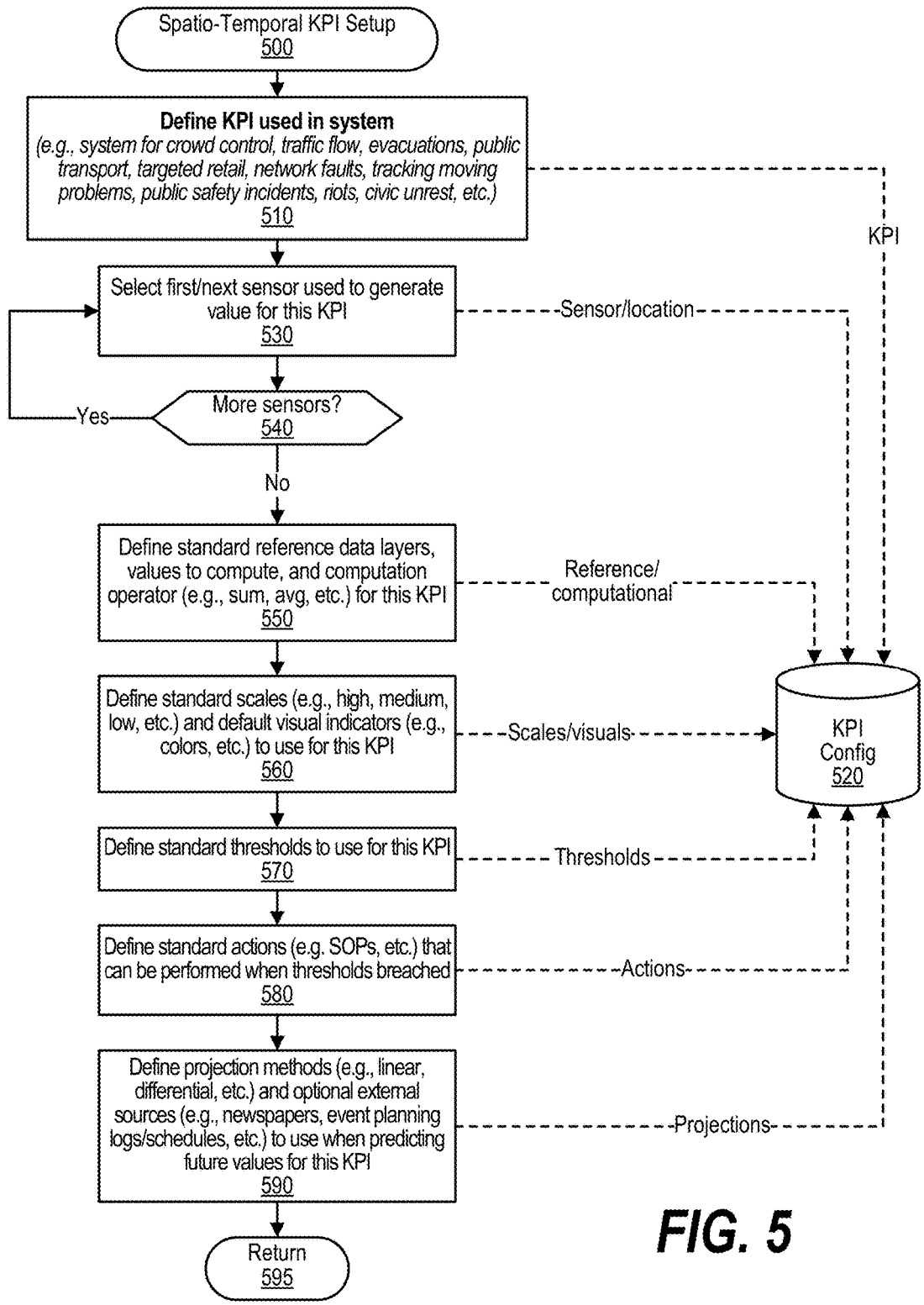
FIG. 5 is a depiction of a flowchart showing the logic performed in setting up ST-KPIs.

FIG. 5 is a depiction of a flowchart showing the logic performed in setting up spatio-temporal key performance indicators (ST-KPIs). Processing commences at 500 whereupon, at step 510, the process receives a definition of an ST-KPI that is used in the system. The particular ST-KPI being defined is based on the type of system being used, such as a system for crowd control, traffic flow, evacuations, public transport, targeted retail, network faults, tracking moving problems, public safety incidents, riots, civic unrest, etc. The defined ST-KPI is stored in a ST-KPI configuration which is stored in data store 520.

Location-based sensors are used to gather data pertaining to the ST-KPI being defined. The sensors are related to the type of information being collected for the ST-KPI so that values can be generated from the inputs received at the sensors. At step 530, the process selects the first sensor that is used in the system to provide inputs to generate ST-KPI values. Data, such as an identifier, pertaining to the selected sensor is stored in the ST-KPI configuration along with the location in the system of the selected sensor. A determination is made as to whether there are additional sensors employed by the system (decision 540). Complex systems, such as found in a smart city, may utilize hundreds, or even thousands of sensors. If additional sensors are being used by the system, then decision 540 branches to the "yes" branch which loops back to receive the next sensor selection and store the sensor information in the ST-KPI configuration. This looping continues until there are no more sensors to select for the system, at which point decision 540 branches to the "no" branch for further processing.

At step 550, the user defines standard reference data layers, values to compute, and computation operator (e.g., sum, avg, etc.) for this ST-KPI. These reference and computational settings are stored in the ST-KPI configuration. At step 560, the user defines the standard scales that will be used for this ST-KPI (e.g., high, medium, low, etc.). In addition, at step 560, the user defines the default visual indicators (e.g., colors, etc.) that will be used for this ST-KPI. The defined scales and visual indicators are stored in the ST-KPI configuration.

At step 570, the user can define standard thresholds that will be used for this ST-KPI. For example, in a smart city example, a standard thresholds for crowd density might be established at being 300 people per block. While the user can alter the default threshold for a particular location, a standard threshold can be used so that the same threshold does not have to be manually established at each location. For example, law enforcement may wish to receive a notification when any location exceeds 300 people per block. However, the system can be fined tuned so that a known heavy traffic location has a manually-established threshold of 500 people per block instead of the standard 300 people per block. The standard thresholds are stored in the ST-KPI configuration.

At step 580, the user can define standard actions (e.g. Standard Operating Procedures ("SOPs"), etc.) that can be performed when thresholds are breached. Using the above example, a standard action can be established to notify law enforcement when crowd density breaches (or is projected to breach) a density of 300 people/block. Likewise, another standard action could be established to dispatch additional law enforcement to the location when the crowd density breaches (or is projected to breach) a density of 400 people/block. Again, the standard actions that are established can be changed for a given location based on the user's expertise and knowledge regarding the system, such as blocks in a smart city. The standard actions are stored in the ST-KPI configuration.

At step 590, the user can define the projection methods (e.g., linear, differential, etc.) and optional external sources (e.g., newspapers, event planning logs/schedules, etc.) that are used when predicting future values for this ST-KPI. For example, with the crowd density example from above, a linear projection method might be selected with the user selecting local external sources, such as a local newspaper or police planning schedule, to use when predicting future values of crowd density throughout the city. For example, if a local event such as a concert or festival, is scheduled, articles about the event, anticipated crowd sizes, dates, and times could be retrieved from the local newspaper and used to better predict the crowd density that will be found in various locations in the city. The projection methods and external sources are stored in the ST-KPI configuration. The process thereafter returns to the calling routine (see FIG. 4) at 595.

Figure 6:
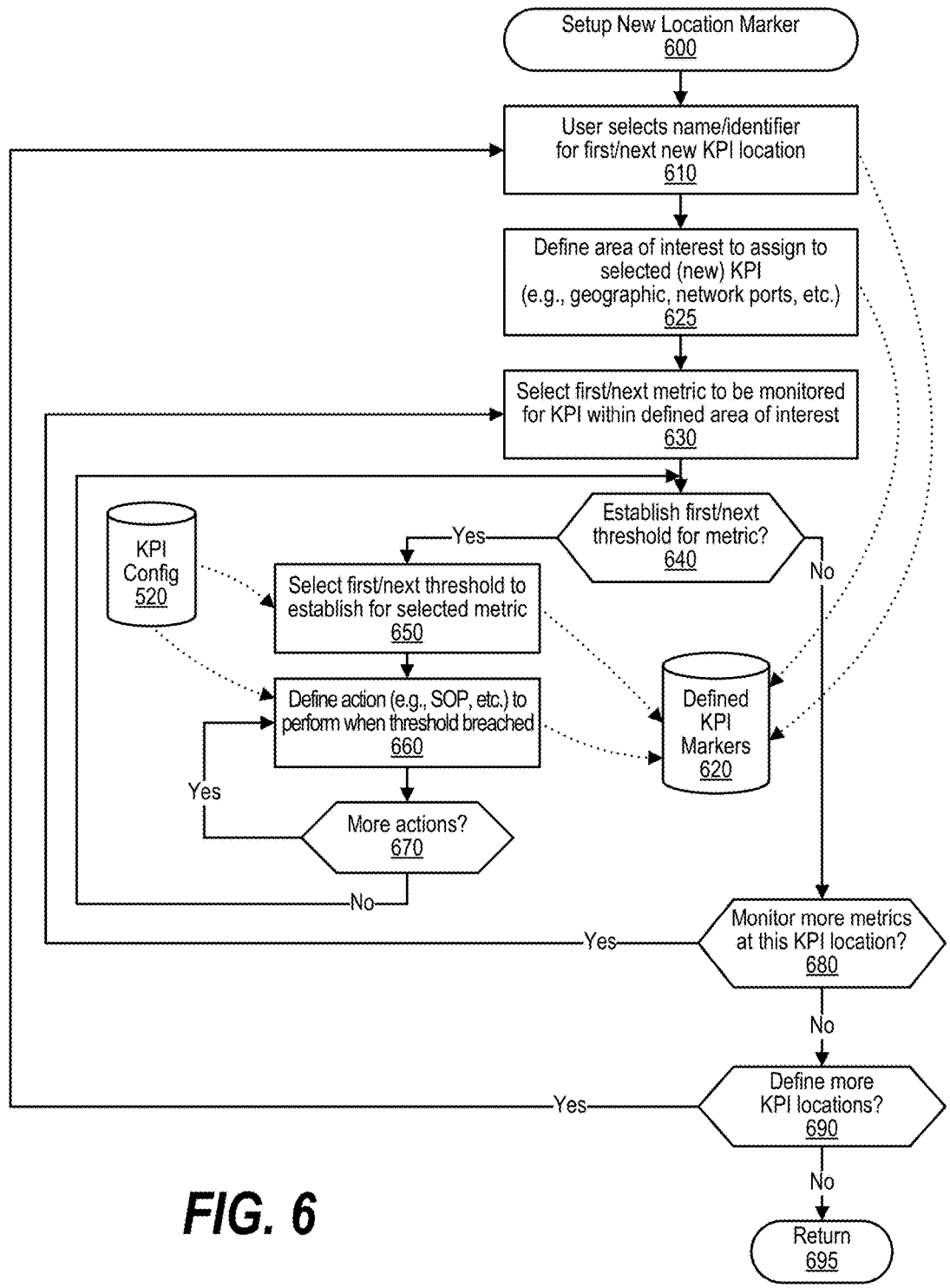
FIG. 6 is a depiction of a flowchart showing the logic used in establishing a new location marker.

FIG. 6 is a depiction of a flowchart showing the logic used in establishing a new location marker. Processing commences at 600 whereupon, at step 610, the user selects the identifier or name for the first new ST-KPI location. The identifier chosen by the user is stored in the set of defined ST-KPI location markers (data store 620). At step 625, the user defines the area of interest to assign to selected (new) ST-KPI location, such as a city block or intersection in a smart city usage or a network location in a networking usage. The defined location area is also stored in data store 620. At step 630, the user selects the first metric to be monitored for ST-KPI within defined area of interest, such as crowd density in a smart city implementation.

A determination is made as to whether the user wishes to establish a threshold for the selected metric (decision 640). If the user wishes to establish one or more thresholds for the metric, then decision 640 branches to the "yes" branch to define the thresholds and actions. At step 650, the user selects the first threshold to establish for selected metric at the selected location. Previously established standard thresholds can be selected from the ST-KPI configuration which are retrieved from data store 520. At step 660, the user define the first action (e.g., SOP, etc.) that is to be performed when the selected threshold is breached (e.g., notify law enforcement, etc.). A determination is made as to whether the user wishes to define additional actions that are performed when the defined threshold is breached (decision 670). If the user wishes to define additional actions, then decision 670 branches to the "yes" branch which loops back to receive additional action selections from the user. This looping continues until the user has no more actions to define, at which point decision 670 branches to the "no" branch which loops back to determine if the user has additional thresholds that they wish to establish for the selected location. The defined thresholds and corresponding actions that are taken when the threshold is breached are stored in data store 620.

Returning to decision 640, if no more thresholds are being established for the selected location, then decision 640 branches to the "no" branch for further processing. A determination is made as to whether the user wishes to monitor more metrics at the selected ST-KPI location (decision 680). If the user wishes to monitor more metrics (e.g., crowd density and traffic flow, etc.), then decision 680 branches to the "yes" branch which loops back to step 630 to select the next metric that will be monitored at this location. This looping continues until the user has no more metrics that he wishes to monitor at this location, at which point decision 680 branches to the "no" branch. A determination is made as to whether the user wishes to define additional ST-KPI locations (decision 690). For example, in the city example shown in FIG. 3, four different locations have been defined and are being monitored. If additional locations are being defined, then decision 690 branches to the "yes" branch which loops back to step 610 for the user to define the next ST-KPI location. This looping continues until no more ST-KPI locations are being defined, at which point decision 690 branches to the "no" branch and process returns to the calling routine (see FIG. 4) at 695.

Figure 7:
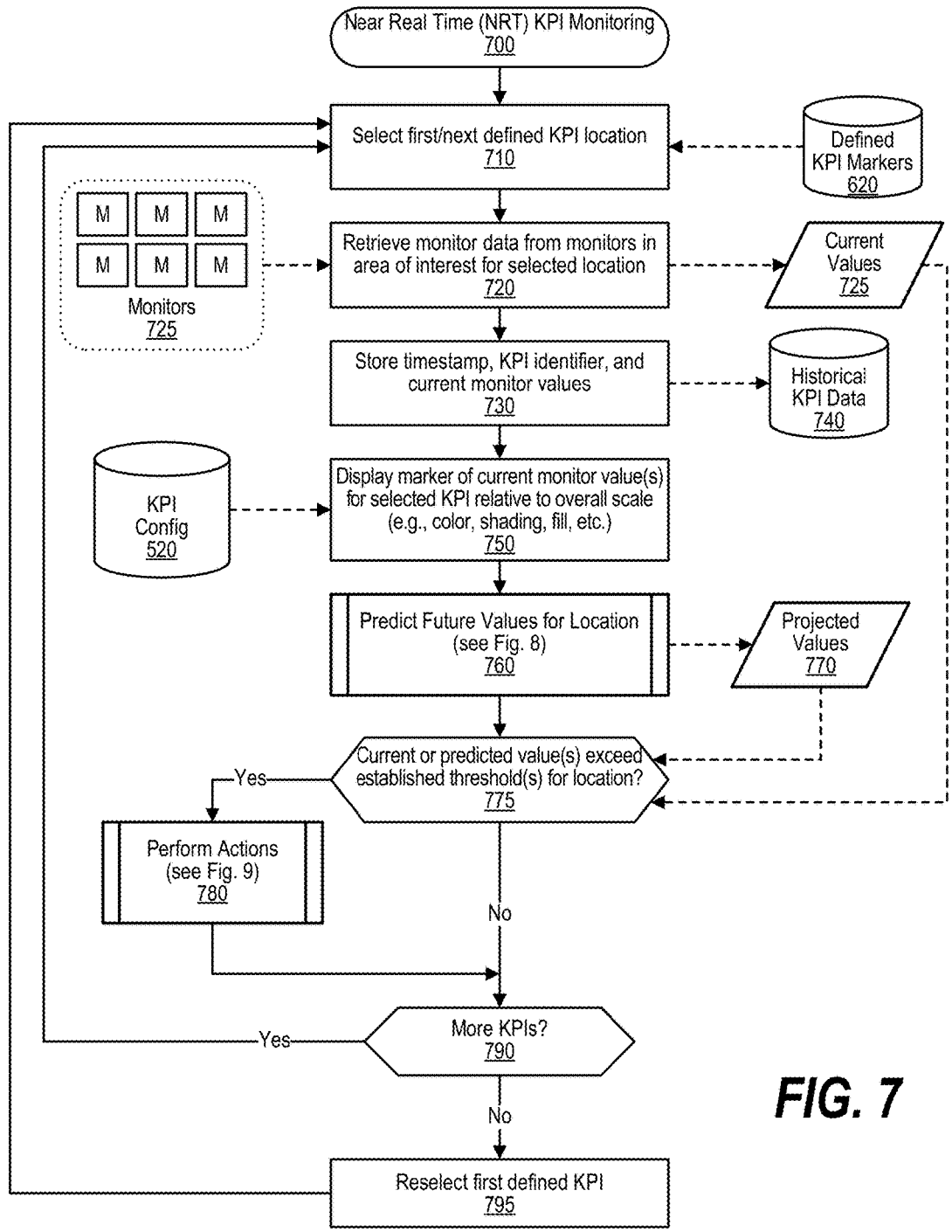
FIG. 7 is a depiction of a flowchart showing the logic performed by the system during near real time (NRT) monitoring of and environment to provide ST-KPIs.

FIG. 7 is a depiction of a flowchart showing the logic performed by the system during near real time (NRT) monitoring of and environment to provide spatio-temporal key performance indicators (ST-KPIs). Processing commences at 700 whereupon, at step 710, the process selects the first defined ST-KPI location from the set of defined ST-KPI location markers which is retrieved from data store 620. At step 720, the process retrieves monitor data from monitors 725 that are at the location, such as monitors near a city intersection or other defined area. The current values are stored in memory area 725.

At step 730, the current timestamp, the ST-KPI location identifier, and the current monitor values received from monitors at the location are stored in data store 740 which is used to store historical ST-KPI data. At step 750, the process retrieves ST-KPI configuration settings from data store 520 and displays a visual marker, or indicator, of the current monitor value, or values, for the selected ST-KPI location relative to the overall scale. The visual indicator might be a color or other visual highlight added to the location on the display so that a user can readily ascertain the current conditions at the location. For an example, the top portion of FIG. 3 depicts visual indicators using different types of lines (solid, dashed, dotted, etc.) to depict different crowd densities at various defined locations in a city.

Figure 8:
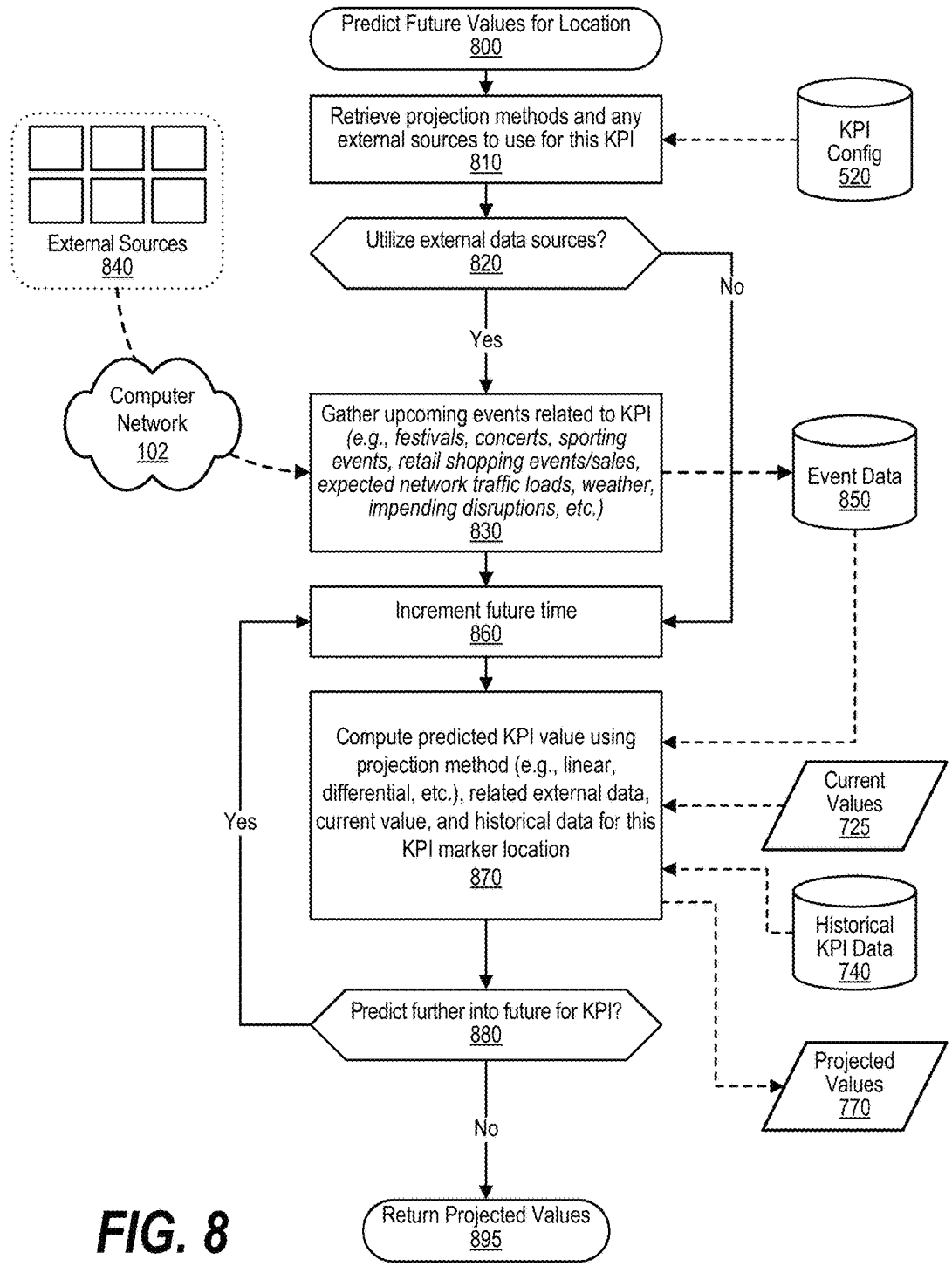
FIG. 8 is a depiction of a flowchart showing the logic performed by the system to predict future values for ST-KPIs.

Returning to FIG. 7, at predefined process 760, the process performs an analysis to predict future values for the location, such as crowd densities that are predicted at the location over the next several hours (see FIG. 8 and corresponding text for further processing details). The predicted future values are stored in memory area 770.

A determination is made as to whether the current or predicted values stored in memory areas 725 or 770 exceed thresholds that have been established for this location (decision 775). If any of the current or predicted values for the location exceed, or breach, a threshold, then decision 775 branches to the "yes" branch whereupon, at predefined process 780, the actions established for such breaches (e.g., SOPs, etc.) are performed (see FIG. 9 and corresponding text for further processing details).

A determination is made as to whether there are additional ST-KPI locations to process (decision 790). If there are more ST-KPI locations to process, then decision 790 branches to the "yes" branch which loops back to select and process the next ST-KPI location as described above. This looping continues until all of the ST-KPI locations have been processed, at which point decision 790 branches to the "no" branch whereupon, at step 795, the process restarts the entire process by reselecting the first defined ST-KPI location and looping back to step 710 to reprocess each of the ST-KPI locations.

FIG. 8 is a depiction of a flowchart showing the logic performed by the system to predict future values for spatiotemporal key performance indicators (ST-KPIs). Processing commences at 800 whereupon, at step 810, the process retrieves ST-KPI configuration settings including the projection method (e.g., linear, differential, etc.) to use with this ST-KPI as well as any external sources (e.g., newspapers, event planning logs/schedules, etc.) to use to predict future values that correspond with the ST-KPI metrics. The ST-KPI configuration settings are retrieved from data store 520.

A determination is made, based on the ST-KPI configuration settings, as to whether external data sources are being utilized to predict future values that correspond with the ST-KPI metrics (decision 820). If external data sources are being utilized, then decision 820 branches to the "yes" branch whereupon, at step 830, the process gathers upcoming events related to the ST-KPI location from external sources 840 which are accessed through computer network 102, such as the Internet. Such upcoming events might include festivals, concerts, sporting events, retail shopping events/sales, expected network traffic loads, weather, impending disruptions, etc. taking place or impacting the ST-KPI-location. In one embodiment, a question/answer (QA) system, such as QA System 100 shown in FIG. 1, is used to ask natural language questions regarding upcoming events at the location. For example, the QA system may be asked "what upcoming events are scheduled for today near $2^{nd}$ street and $6^{th}$ avenue in Anytown, Texas?" and the QA system provides responsive answers to the question. The upcoming event data gathered from the external sources is stored in data store 850. Returning to decision 820, if external data sources are not being utilized, then decision 820 branches to the "no" branch bypassing step 830.

At step 860, the current time is incremented to a first future time (e.g., ten minutes from the present time, etc.). At step 870, the process computes a predicted future value for the ST-KPI (e.g., crowd density, traffic flow, etc.) using the projection method (e.g., linear, differential, etc.) retrieved from the ST-KPI configuration file, the related external data (if any) gathered and stored in data store 850, the current value of the ST-KPI from memory area 725, and historical data of past values for this ST-KPI at this location from data store 740. The calculated predicted future value is stored in memory area 770. A determination is made as to whether to predict further into the future for this ST-KPI at this location (decision 880). For example, the system may be configured to predict future values that correspond to the ST-KPI metric for a twenty four or forty eight hour period. If more predicted future values are needed, then decision 880 branches to the "yes" branch which loops back to increment the future time (e.g., from ten minutes to twenty minutes, etc.) and then re-compute the predicted time at the newly incremented future time. This looping continues until the needed predicted future values corresponding to the ST-KPI metric at this location have been computed and stored in data store 770. At this point, decision 880 branches to the "no" branch and, at 995, processing returns the predicted future values corresponding to this ST-KPI at this location back to the calling routine (see FIG. 7).

Figure 9:
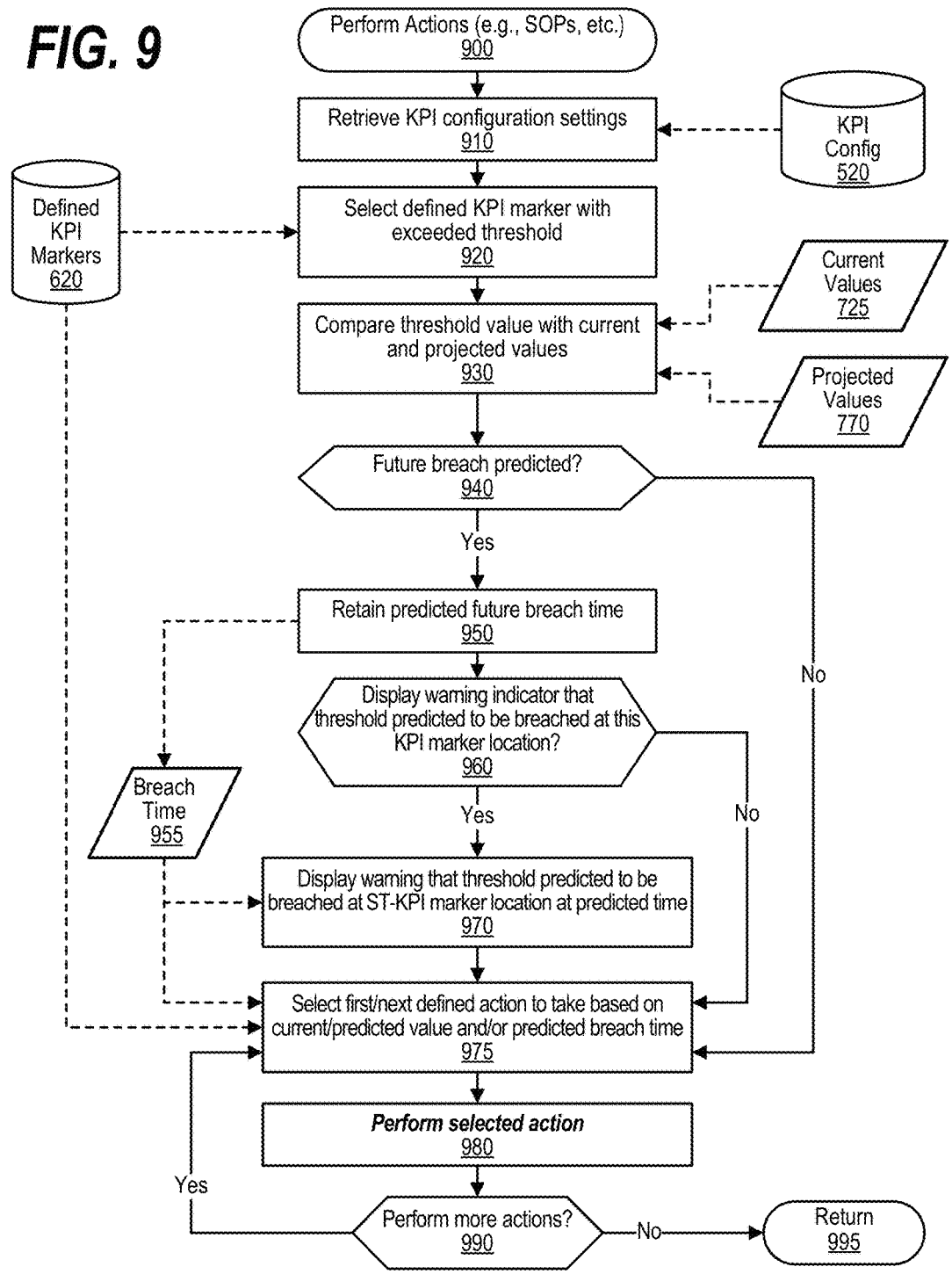
FIG. 9 is a depiction of a flowchart showing the logic used to perform actions when a threshold value is breached.

FIG. 9 is a depiction of a flowchart showing the logic used to perform actions when a threshold value is breached. Processing commences at 900 whereupon, at step 910, the process retrieves ST-KPI configuration settings from data store 520. At step 920, the process selects the defined ST-KPI location marker with an ST-KPI metric, either a current value or a predicted future value, that has breached a threshold. The data pertaining to the ST-KPI locations, including actions to perform when a threshold is breached, is retrieved from data store 620. At step 630, the process compares the threshold value(s) pertaining to the ST-KPI location marker with the current values for the ST-KPI metric at the location as well as the predicted future values for the ST-KPI metric at the location. The current ST-KPI metric value(s) are retrieved from memory area 725 and the predicted future value(s) for the ST-KPI metric are retrieved from memory area 770.

A determination is made as to whether a future breach of the ST-KPI threshold established for the location is being predicted (decision 940). For example, the current crowd density at a location might not breach the threshold, but based on the process performed in FIG. 8, the crowd density may be expected to breach the threshold in the next hour. If a future breach of the ST-KPI threshold established for the location is being predicted, then decision 940 branches to the "yes" branch to process the predicted breach. At step 950, the process retains the future time (e.g., 11:15 PM, etc.) at which the threshold is predicted to be breached. The predicted future time is stored in memory area 955. A determination is made, based on factors such as the extent of the breach, how far in the future the breach is expected, and other settings configured by the user, as to whether to display a warning indicator informing the user that the threshold is predicted to be breached at this ST-KPI location at the predicted breach time (decision 960). If a warning should be displayed, then decision 960 branches to the "yes" branch whereupon, at step 970, the process displays a warning to the user indicating that the threshold is predicted to be breached at this ST-KPI location at the predicted breach time. For example, on the top portion of FIG. 3, locations that have ST-KPI thresholds that are expected to be breached might be visually highlighted by having the indicator displayed at the location blink or displayed in a particular color (e.g., red, yellow, etc.). This indication would alert the user and allow the user to further analyze the situation. On the other hand, if a warning should not be displayed, then decision 960 branches to the "no" branch bypassing step 970. Returning to decision 940, if a future breach of a threshold is not being predicted, then decision 940 branches to the "no" branch bypassing steps 950 through 970.

At step 975, the process selects the first defined action from data store 620 with the selected action being an action that is performed when the current or predicted future value of the ST-KPI metric at this location is breached. The actions can be based on a threshold being exceeded by an ST-KPI metric, the rate of change of the current or predicted future values (e.g., rapidly increasing values, etc.), as well as trends detected in the historical values that result in higher predicted future values. At step 980, the selected action is performed (e.g., notify law enforcement, dispatch crowd control personnel, etc.). A determination is made as to whether additional actions are to be performed given the actions established in data store 620 (decision 990). If additional actions have been established to be performed given the threshold and current and/or predicted future values, then decision 990 branches to the "yes" branch which loops back to select and perform the next action. This looping continues until all of the appropriate actions have been performed, at which point the process returns to the calling routine (see FIG. 7) at 995.

Figure 10:
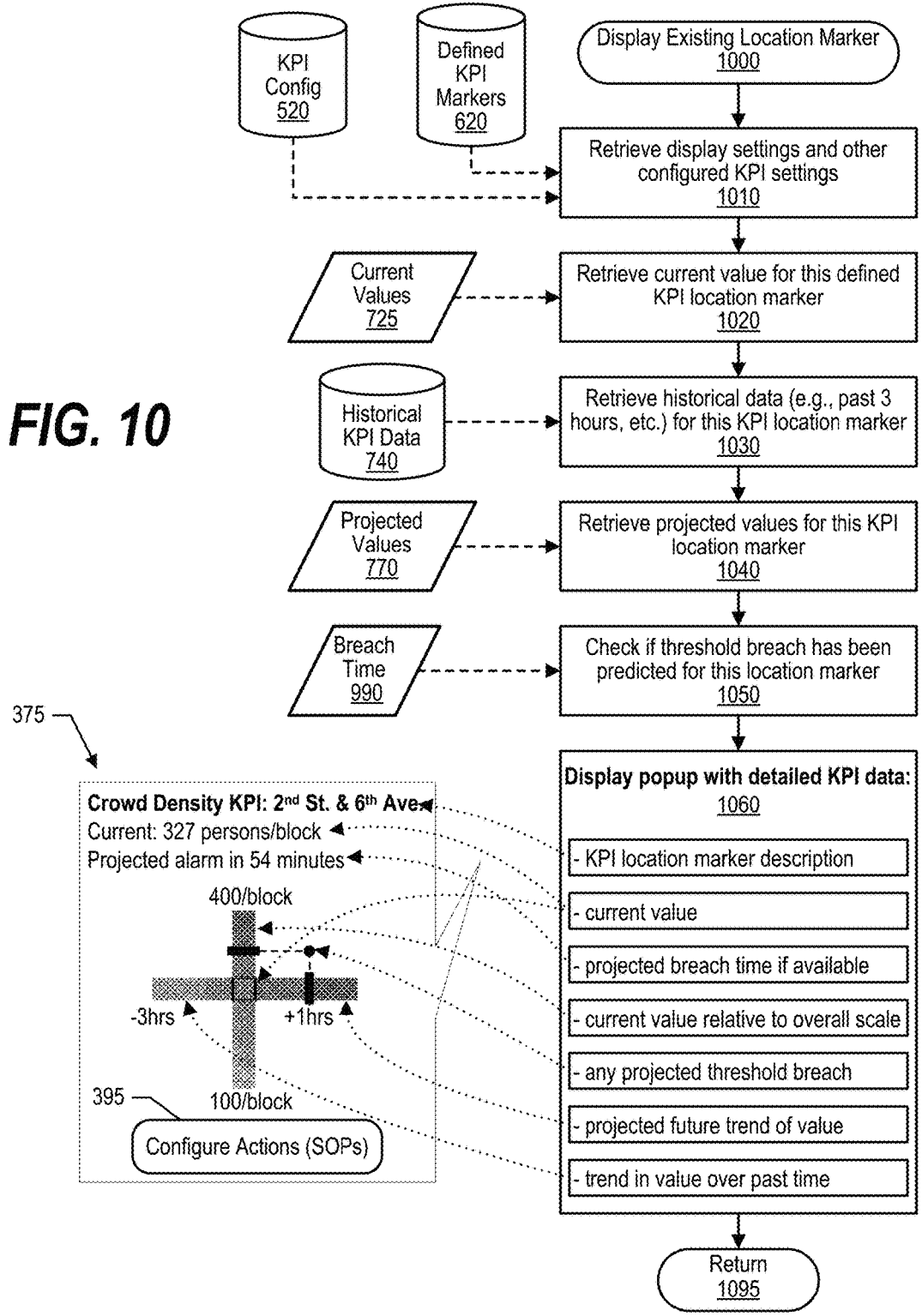
FIG. 10 is a depiction of a flowchart showing the logic performed in displaying detailed spatio-temporal key performance indicator (ST-KPI) data corresponding to a user-selected location.

FIG. 10 is a depiction of a flowchart showing the logic performed in displaying detailed spatio-temporal key performance indicator (ST-KPI) data corresponding to a user-selected location. Processing commences at 1000 whereupon, at step 1010, the process retrieves display settings and other ST-KPI settings from data stores 520 and 620 with data store 520 providing general, or standard, settings and data store 620 providing settings configured for this particular ST-KPI location. At step 1020, the process retrieves current value(s) pertaining to the defined ST-KPIs at this location marker (e.g., crowd density, traffic flow, etc.). The current values are retrieved from memory area 725. At step 1030, the process retrieves historical data, such as the ST-KPI data received over the past several hours, at this ST-KPI location. The historical data is retrieved from data store 740. At step 1040, the process retrieves predicted future values that have been predicted (calculated) for this ST-KPI location. The predicted future values were calculated by the process shown in FIG. 8 and are retrieved from memory area 770. In addition, at step 1050, any predicted breach time that has been predicted for this ST-KPI location are retrieved from memory area 990 (e.g., a breach of a threshold has been predicted to occur 54 minutes from the current time, etc.).

At step 1060, the process displays a popup window with detailed ST-KPI data pertaining to the ST-KPI location. Popup window 375 is shown in context of its parent window in FIG. 3. As shown, popup window 375 displays abundant data pertaining to the ST-KPI location. This data includes the ST-KPI location marker description (e.g., "Crowd Density KPI: $2^{nd}$ St. & $6^{th}$ Ave.," etc.), the current value of the ST-KPI metric (e.g., current crowd density 327 persons/block, etc.), the projected breach time of the threshold at this location (e.g., projected alarm in 54 minutes, etc.), the current value relative to the overall scale that is being used in a vertical shaded bar depiction, a visual marker showing the projected threshold breach, the projected future trend of the ST-KPI metric using predicted future values shown in a horizontal shaded bar depiction to the right of the current value, and a historical trend in the value of the ST-KPI metric shown in a horizontal shaded bar depiction to the left of the current value. The user can also define additional thresholds and actions by selecting command button 395. The process thereafter returns to the calling routine (see FIG. 4) at 1095.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. An information handling system comprising:
  one or more processors;
  a memory coupled to at least one of the processors;
  a set of instructions stored in the memory and executed by at least one of the processors, wherein the set of instructions perform actions of:
    defining a plurality of geographic areas respectively corresponding to geographic portions of a city environment;
    for each geographic area of the plurality of geographic areas, receiving a user selection of one or more sensors, selected from a plurality of sensors, wherein the plurality of sensors comprises one or more permanent sensors and one or more temporary sensors, and wherein the plurality of sensors further comprises one or more cameras and one or more noise detection sensors;
    for each geographic area of the plurality of geographic areas, tracking a plurality of metrics, wherein the tracking is performed at a plurality of times, and wherein the metrics are obtained from the one or more selected sensors that perform the tracking in near-real-time;
    for each geographic area of the plurality of geographic areas, determining, by machine logic, a spatio-temporal key performance indicator crowd density value (S-T KPI CDV) corresponding to the geographic area at each of the plurality of times;

for each geographic area of the plurality of geographic areas, calculating, by machine logic, a crowd density projection value for the geographic area based, at least in part, upon the S-T KPI CDVs for the geographic area, with the crowd density projection value reflecting a predicted crowd density for a future time occurring subsequent to the plurality of times; and in response to determining that a first crowd density projection value for a first geographic area exceeds a first predetermined threshold value, alerting a device of a law enforcement official.

2. The information handling system of claim 1 wherein the actions further comprise:

determining, by machine logic, that a second crowd density projection value for a second geographic area is less than a second predetermined threshold value; and responsive to the determination that the second crowd density projection value is less than the second predetermined threshold value, alerting, by machine logic, the device of the law enforcement official.

3. A computer program product comprising:

a storage medium that is not in the form of a signal per se; and computer code stored in the storage medium, with the computer code including instructions and data for causing one or more processors to perform operations including the following:

defining a plurality of geographic areas respectively corresponding to geographic portions of a city environment;

for each geographic area of the plurality of geographic areas, receiving a user selection of one or more sensors, selected from a plurality of sensors, wherein the plurality of sensors comprises one or more permanent sensors and one or more temporary sensors, and wherein the plurality of sensors further comprises one or more cameras and one or more noise detection sensors;

for each geographic area of the plurality of geographic areas, tracking a plurality of metrics, wherein the tracking is performed at a plurality of times, and wherein the metrics are obtained from the one or more selected sensors that perform the tracking in near-real-time;

for each geographic area of the plurality of geographic areas, determining, by machine logic, a spatio-temporal key performance indicator crowd density value (S-T KPI CDV) corresponding to the geographic area at each of the plurality of times;

for each geographic area of the plurality of geographic areas, calculating, by machine logic, a crowd density projection value for the geographic area based, at least in part, upon the S-T KPI CDVs for the geographic area, with the crowd density projection value reflecting a predicted crowd density for a future time interval occurring subsequent to the plurality of times; and in response to determining that a first crowd density projection value for a first geographic area exceeds a first predetermined threshold value, alerting a device of a law enforcement official.

4. The computer program product of claim 3 wherein the operations further comprise:

determining, by machine logic, that a second crowd density projection value for a second geographic area is less than a second predetermined threshold value; and responsive to the determination that the second crowd density projection value is less than the second predetermined threshold value, alerting, by machine logic, the device of the law enforcement official.

* * * * *